United States Patent [19]
Riad

[11] Patent Number: 5,934,419
[45] Date of Patent: Aug. 10, 1999

[54] FRICTIONAL SHOCK ABSORBER

[76] Inventor: Fawzy Riad, 16725 Kyla, Clinton Township, Mich. 48038

[21] Appl. No.: 09/123,667

[22] Filed: Jul. 22, 1998

Related U.S. Application Data

[60] Continuation-in-part of application No. 08/852,784, May 7, 1977, abandoned, which is a division of application No. 08/664,626, Jun. 17, 1996, Pat. No. 5,845,896, which is a continuation-in-part of application No. 08/525,185, Sep. 8, 1995, abandoned.

[51] Int. Cl.$^6$ ..................................................... F16F 13/06
[52] U.S. Cl. .......................... 188/129; 188/381; 267/210; 267/196
[58] Field of Search ..................................... 188/129, 381, 188/130, 281, 271, 83; 267/196, 201, 202, 203, 204, 205, 206, 207, 208, 209, 210, 211, 216, 134–135, 138; 213/31, 22, 26, 23, 37–39, 32 R; 16/337, 341; 482/114

[56] References Cited

U.S. PATENT DOCUMENTS

| | | | |
|---|---|---|---|
| 810,282 | 1/1906 | House | 188/129 |
| 875,759 | 1/1908 | Whitcomb | 188/129 |
| 964,201 | 7/1910 | Bolton, Jr. | 188/129 |
| 1,121,315 | 12/1914 | Williams | 188/129 |
| 1,153,531 | 9/1915 | Adams | 188/129 |
| 1,160,976 | 11/1915 | Myers | 188/129 |
| 1,260,019 | 3/1918 | Oliver | 188/129 |
| 1,334,247 | 3/1920 | Killian | 267/210 |
| 1,335,290 | 3/1920 | Myers | 188/129 |
| 1,713,914 | 5/1929 | O'Connor | 188/129 |
| 2,002,100 | 5/1935 | Smith | 188/129 |
| 2,752,149 | 6/1956 | Forcellini | 188/129 |
| 2,819,894 | 1/1958 | Tack | 188/129 |
| 3,666,057 | 5/1972 | Leifer et al. | 188/83 |
| 4,165,885 | 8/1979 | Good et al. | 188/129 |
| 4,792,127 | 12/1988 | Körtgen | 188/129 |
| 5,845,896 | 12/1998 | Riad . | |

FOREIGN PATENT DOCUMENTS

| | | | |
|---|---|---|---|
| 1078815 | 6/1953 | France | 188/129 |
| 1167999 | 11/1956 | France | 188/129 |

*Primary Examiner*—Douglas C. Butler

[57] ABSTRACT

A shock absorber for damping the vibrations of the car by friction between two solid materials. The first solid material is the square aluminum cylinder and the second consists of two aluminum links. The two links are hinged at one end by the rod and pushed at the other end against the cylinder by a spring. This arrangement will help selecting the pulling force and the pushing force as required and within reasonable values.

4 Claims, 2 Drawing Sheets

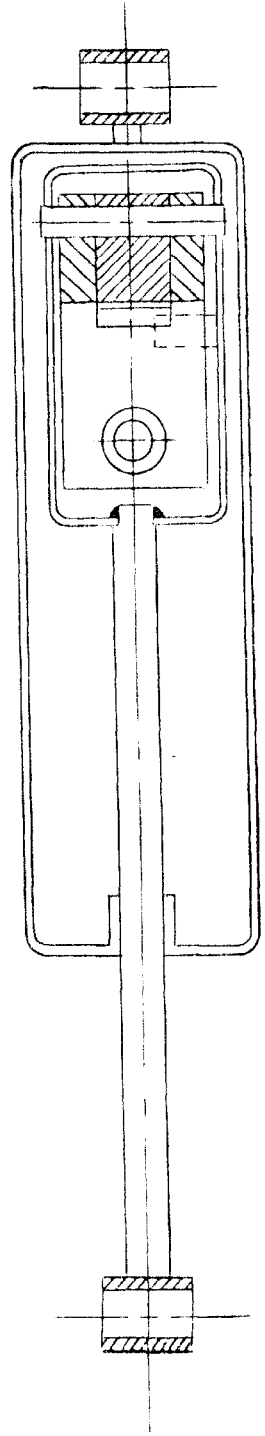
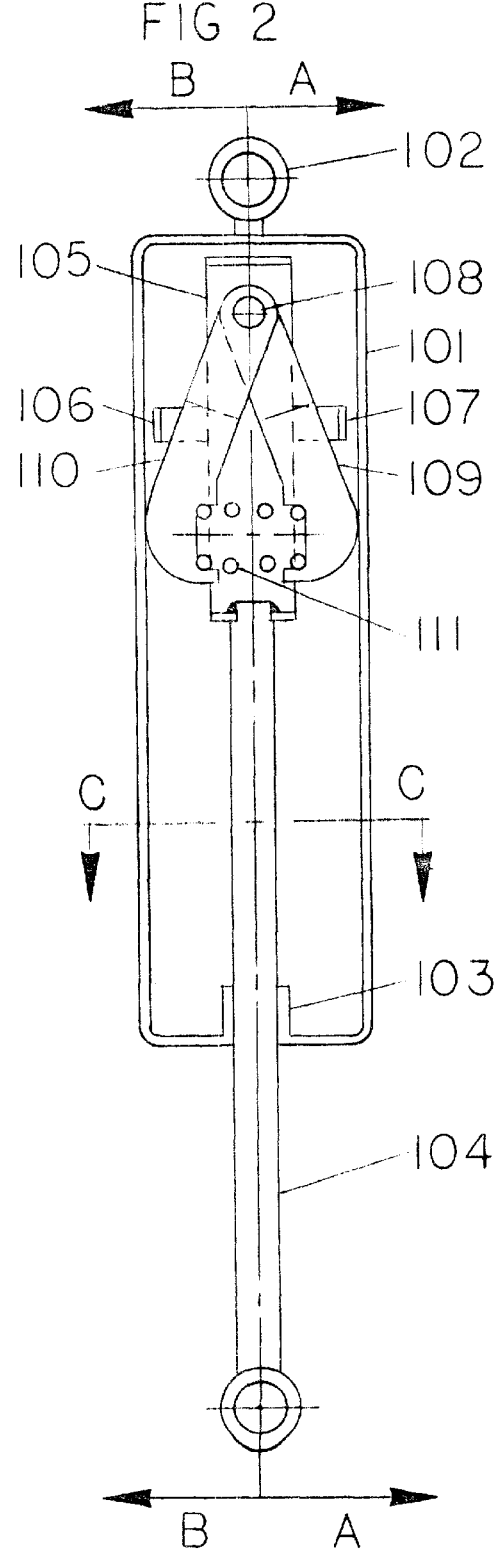
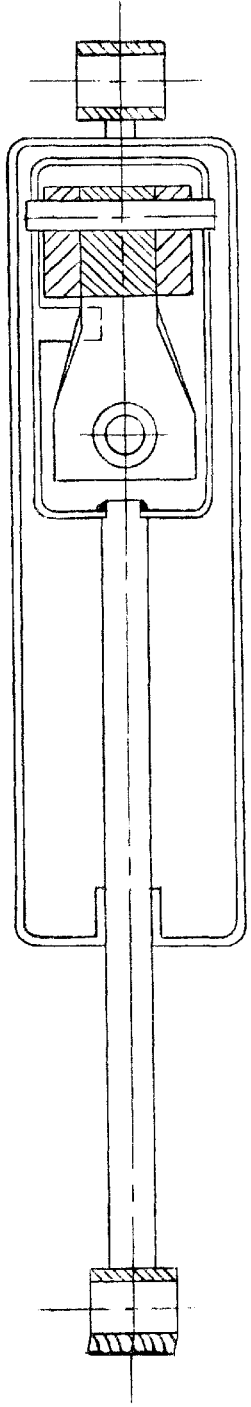
FIG 1
FIG 2
FIG 3

FIG 4
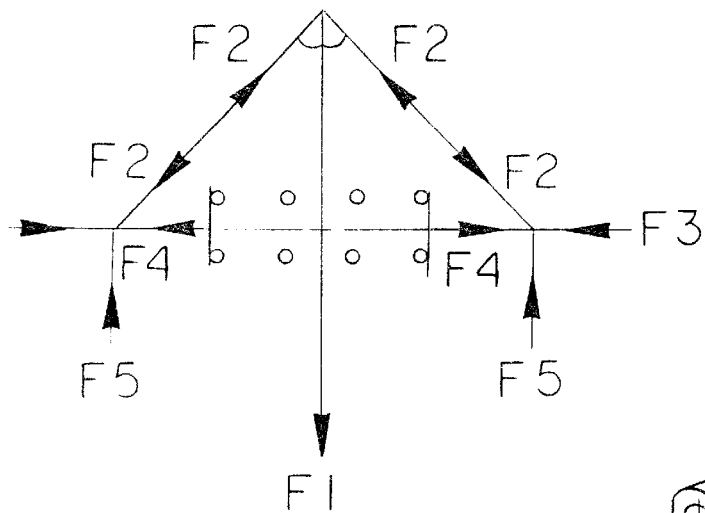
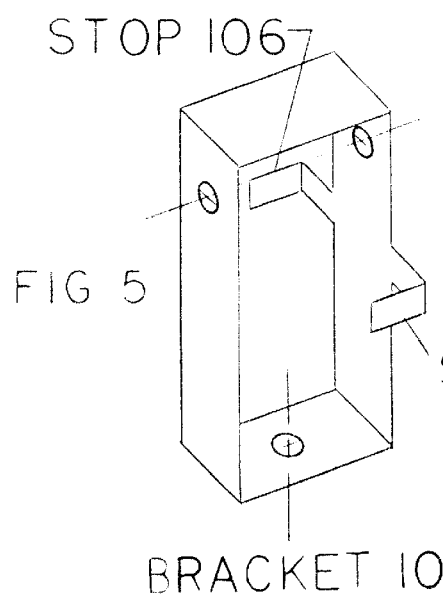
FIG 5
STOP 106
STOP 107
BRACKET 105
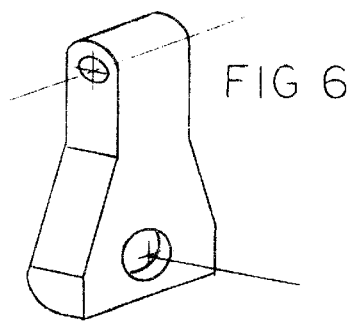
FIG 6
LINK 109
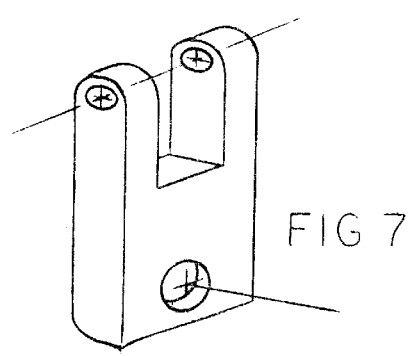
FIG 7
LINK 110
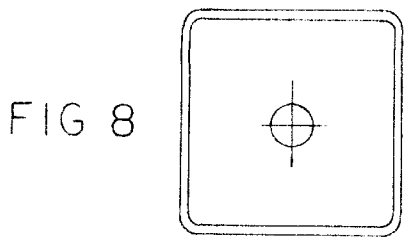
FIG 8

FRICTIONAL SHOCK ABSORBER

CROSS-REFERENCES TO RELATED APPLICATIONS

This application is a continuation-in part of application Ser. No. 08/852,784 filed on May 7, 1997, now abandoned, which is divisional of application Ser. No. 08/664,626 filed on Jun. 17, 1996, now U.S. Pat. No. 5,845,896 which is a continuation-in-part of application Ser. No. 08/525,185 filed on Sep. 8, 1995, now abandoned.

BACKGROUND OF THE INVENTION (1) It is a shock absorber to absorb the vehicle vibrations caused by the unevenness of the road, he hydraulic shock absorbers used in most cars.

(2) In case of the hydraulic shock absorber, when a bump hits the wheel of a car the velocity of the fluid passing through the tiny holes of the will be very high creating a very high resistance in it. It will almost as a solid rod between the wheel and the frame eliminating the flexibility of the spring supporting the frame of the car. The friction shock absorber does not have this disadvantage. When the wheel moves up at a very high velocity the friction will not increase, on the contrary it will decrease. This means that the friction shock absorber will absorb the viobrations while keeping the flexibility of the spring.

BRIEF SUMMARY OF THE INVENTION

It is a shock absorber similar to the hydraulic shock absorber but the vibrations are absorbed by friction between two solid parts, both made of aluminum. This will keep the pushing force and the pulling force within reasonable limits. The friction shock absorber can be designed these two forces be as required.

BRIEF DESCRIPTION OF THE DRAWINGS

FIGS. 1–3 show the shock absorber.

FIG. 4 shows the forces acting in the system.

FIGS. 5, 6 and 7 show the bracket, right link, and left link, respectively.

FIG. 8 shows section C C in FIG. 2.

DETAILED DESCRIPTION OF THE INVENTION

FIG. 1 shows the assembly of the shock-absorber: 101 is a square cylinder made of aluminum with It has an attached end 102 and a guide 103. 104 is a rod welded to a bracket 105. Two links 109 and 110 are made of aluminum and hinged to a bracket 105 by a rod 108. These two links are pushed against the inside surface of the square cylinder 101 by a spring 111. While a rod 104 moves axially through the guide 103 the two links 109 and 110 slide on the inside surface of the cylinder 101.The friction of this sliding motion will absorb the vibration.

FIG. 4 is a sketch showing the forces acting in the whole system

The frictional shock absorber shown in FIG. 1, includes a rectangular cylinder 101 made of aluminum, a rod 104 welded to a bracket 105. The rectangular cylinder 101 has a first end 102 which provides an attaching point and a second end which has a sealed guide 103 for the rod 104. The bracket 105 has a pin 108. Two aluminum links 109 and 110 have two ends one end swivels around the pin 108 and the other end slides along the interior surface of the rectangular cylinder 101. A coil spring 111 is pushing the two links 109 and 110 against the interior surface of the rectangular cylinder 101. The bracket 105 has two stops 106 and 107 to limit the angle n shown in FIG. 1. A because the more the angle n increases the more the force pulling the rod 104 increases and it can increase until no force can pull the rod except by tearing the shock absorber apart. Angle n can increase by tear and wear of the links and the cylinder.

FIG. 4 illustrates a diagram of the forces acting upon the frictional shock absorber shown in FIG. 1.

(A1)

$$F1 = 2*F2*\cos n$$

$$F2 = F1/(2*\cos n) \tag{1}$$

$$F3 = F2*\sin n + F4 \tag{2}$$

$$F5 = c*F3 \quad c = \text{The coefficient of friction between the aluminum links and the aluminum rectangular cylinder.}$$

From (10, (2) and (3)
$$F5/c = F1*\sin n/(2*\cos) + F4 \quad F1 = 2*F5$$
$$F1/(2*c) = [(F1*\tan n)/2] + F4$$

$$F1 = (2*c*F4)/(1 - c*\tan n) \tag{4}$$

Equation (4) shows the relation between F1, F4, and the angle n during extension of the shock absorber.

Following similar steps.

$$F1 = (2*c*F4)/(1 + c*\tan n) \tag{5}$$

(A1 Cont.)

Equation (5) shows the same as equation (4) but during contraction of the shock absorber.

Example:

Assume: n=27, force of spring 111 (F4)=8 lb., c=1.4

$$F1 \text{ (extension)} = (2*c*F4)/(1 - c*\tan n)$$
$$= (C*1.4*8)/(1 - 1.4*\tan 27)$$
$$= 78.14 \text{ lb}$$
$$F1 \text{ (contraction)} = (2*c*F4)/(1 + c*\tan n)$$
$$= (2*1.4*8)/(1 + 1.4*\tan 27)$$
$$= 13 \text{ lb}$$

To show the importance of the stops which limits the angle n.

Assume: n=35.53

Tan n=0.71429

$$F1 \text{ (extension)} = (2*c*F4)/(1 - 1.41*.71429)$$
$$= (2*c*F4)/(1 - 1)$$
$$= (2*c*F4)/0$$
$$= \text{Infinity}$$

This means that the main spring of the vehicle between the wheel and the frame will not rebound uless the shock absorber is torn apart.

The reason for choosing the links 109 and 110 as well as the square cylinder 101 made of aluminum is this:

Every two solid materials have two coeffiient of friction one static and the other sliding. The first one is always higher than the second. The first one which is higher will prevent the main vehicle spring from rebound until the rebound force is higher than the frictional force of the shock absorber. The second one which is lower will let the frame rebound with a small resistance absorbing a small amount of energy and damping less vibration.

Aluminum with aluminum does not hase this defect because the sliding coefficient of friction is higher than the static coefficient.

Here are some of the coefficient of friction quated from Marks Handbook.

| Material | Coefficient of Static and Sliding Friction | |
|---|---|---|
| | Static | Sliding |
| Hard steel on hard steel | .78 | .42 |
| Mild steel on mild steel | .74 | .57 |
| Mild steel on lead | .95 | .95 |
| Copper on mild steel | .53 | .36 |
| Aluminum on aluminum | 1.05 | 1.4 |

The proof that my invention is different than July 1953, Dusol (815) is as follows:

1. In Dusol the pads are not necessarily flat because his FIG. 2 is a sketch. It is not a front view or a section. If the surfaces G are flat and the cylinder is square he should have mentioned that because the common cylinder is round. There is no reason for him to have the cylinder square because he does not care about the effect of the angle n in my drawings. In his claim he said that the force of the spring is the only factor that changes the frictional force. The angle a in his FIG. 3 is used to change the length of the spring R and by doing that the frictional force gets less as the pads move higher relative to the surfaces G. It is a different system, in my case the force to push or pull the rod is always constant and does not depend on the height of the links relative to the rectangular cylinder.

2. I am not using any pads, I am using aluminum with aluminum.
3. His links swivel around the rod. My links swivel around a pin attached to the bracket welded to the rod.
4. What he did will not encourage anybody to use because he did not say what is good about it or how to use it to make a better shock absorber. My invention is convincing clear and complete. All the information needed to make a better shock absorber than the hydraulic shock absorber used now are available.

I claim:

1. A shock absorber for a vehicle comprissing:

a rectangular aluminum cylinder, a rod welded to a bracket, two-aluminum links, a coil spring, said rectangular cylinder has two ends, one end has an attaching point and the other end has a sealed guide for said rod, said bracket has a pin, said aluminum links each has two ends one end swiveling around the said pin, and the other end sliding along the interior surface of the said rectangular cylinder, said coil spring is pushing the two links against the interior surface of the said cylinder.

2. The shock absorber of claim 1, wherein the forces to pull the rod are higher than the forces to push the rod.

3. The shock absorber of claim 1, wherein the forces to pull the rod are selectable by changing the rate of the coil spring, and/or the angles between the rod and links.

4. The shock absorber of claim 1, wherein the bracket includes two stops to limit the angles between the rod and links.

* * * * *